United States Patent
Zhuang et al.

(10) Patent No.: US 10,797,775 B2
(45) Date of Patent: Oct. 6, 2020

(54) BACKHAUL TRANSMISSION METHOD FOR WIRELESS COMMUNICATION, CONTROLLER, BASE STATION, AND GATEWAY

(71) Applicant: HUAWEI TECHNOLOGIES CO., LTD., Shenzhen, Guangdong (CN)

(72) Inventors: Hongcheng Zhuang, Shenzhen (CN); Zezhou Luo, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/036,142

(22) Filed: Jul. 16, 2018

(65) Prior Publication Data

US 2018/0323851 A1    Nov. 8, 2018

Related U.S. Application Data

(63) Continuation of application No. PCT/CN2016/109277, filed on Dec. 9, 2016.

(30) Foreign Application Priority Data

Jan. 16, 2016 (CN) .......................... 2016 1 0029015

(51) Int. Cl.
*H04B 7/06* (2006.01)
*H04L 5/00* (2006.01)
(Continued)

(52) U.S. Cl.
CPC ......... *H04B 7/0639* (2013.01); *H04L 5/0048* (2013.01); *H04W 92/20* (2013.01);
(Continued)

(58) Field of Classification Search
None
See application file for complete search history.

(56) References Cited

U.S. PATENT DOCUMENTS

2006/0203778 A1* 9/2006 Han ................. H04W 72/1257
                                                370/335
2012/0014272 A1* 1/2012 Zhou ..................... H04L 5/0035
                                                370/252
(Continued)

FOREIGN PATENT DOCUMENTS

CN      101931961 A      12/2010
CN      103299668 A       9/2013
(Continued)

OTHER PUBLICATIONS

International Search Report, dated Jan. 26, 2017, in International Application No. PCT/CN2016/109277 (4 pp.).
(Continued)

*Primary Examiner* — Ayaz R Sheikh
*Assistant Examiner* — Tarell A Hampton
(74) *Attorney, Agent, or Firm* — Womble Bond Dickinson (US) LLP

(57) ABSTRACT

Discloses is a backhaul transmission method for wireless communication, a controller, a base station, and a gateway. The method includes: sending, by a first base station, information about a backhaul requirement of the first base station to a controller; obtaining, by the first base station, information about a codebook from the controller, where the information about the codebook is determined based on the backhaul requirement of the first base station; and performing, by the first base station, backhaul transmission with a gateway by using the codebook. Information about a codebook used in backhaul transmission is determined based on a backhaul requirement of a base station, so that backhaul requirements of different base stations can be met, and a backhaul capacity of a system is increased.

10 Claims, 9 Drawing Sheets

(51) Int. Cl.
*H04W 92/20* (2009.01)
*H04W 88/16* (2009.01)
*H04W 88/14* (2009.01)
*H04W 92/12* (2009.01)
*H04W 92/04* (2009.01)

(52) U.S. Cl.
CPC ............ *H04W 88/14* (2013.01); *H04W 88/16* (2013.01); *H04W 92/045* (2013.01); *H04W 92/12* (2013.01)

(56) References Cited

U.S. PATENT DOCUMENTS

| | | |
|---|---|---|
| 2012/0093059 A1 | 4/2012 | Bai et al. |
| 2013/0115985 A1* | 5/2013 | Davydov ............... H04B 7/024 455/501 |
| 2013/0336270 A1 | 12/2013 | Nagata et al. |
| 2014/0321282 A1 | 10/2014 | Pragada et al. |
| 2015/0181455 A1 | 6/2015 | Song et al. |
| 2015/0215934 A1* | 7/2015 | Davydov ............. H04B 7/0456 370/329 |
| 2015/0236765 A1* | 8/2015 | Yu ...................... H04B 7/0452 375/267 |
| 2015/0257051 A1* | 9/2015 | Rao ................... H04W 36/0061 455/439 |
| 2015/0282185 A1* | 10/2015 | Nikopour ............. H04L 1/0002 370/329 |
| 2015/0334033 A1 | 11/2015 | Wang et al. |
| 2016/0197654 A1* | 7/2016 | Zhang ................... H04B 7/024 370/329 |
| 2016/0219589 A1* | 7/2016 | Khawer ............ H04W 72/0453 |
| 2016/0241314 A1* | 8/2016 | Ferrante ............ H04W 72/0406 |
| 2016/0345309 A1* | 11/2016 | Xiong .................. H04J 11/0053 |
| 2016/0374007 A1 | 12/2016 | Tian et al. |
| 2018/0198500 A1* | 7/2018 | Choi .................... H04B 7/0478 |
| 2018/0205591 A1* | 7/2018 | Wang ..................... H04L 25/03 |
| 2018/0351668 A1* | 12/2018 | Kim ................... H04J 11/0053 |
| 2019/0020388 A1* | 1/2019 | Lee ..................... H04B 7/0478 |
| 2019/0081680 A1* | 3/2019 | Wu ..................... H04B 7/0478 |

FOREIGN PATENT DOCUMENTS

| | | |
|---|---|---|
| CN | 103782644 A | 5/2014 |
| CN | 103973645 A | 8/2014 |
| WO | 2015127598 A1 | 9/2015 |

OTHER PUBLICATIONS

CMCC, "Backhaul signaling for CoMP-NIB operation," 3GPP TSG RAN WG1 Meeting #76bis, R1-141617, Shenzhen, China, Mar. 31-Apr. 4, 2014, pp. 1-3.

Written Opinion of the International Searching Authority, dated Jan. 26, 2017, in International Application No. PCT/CN2016/109277 (6 pp.).

R1-112468, Huawei, HiSilicon, "Spatial multiplexing for 8Tx Uplink relay backhaul," 3GPP TSG RAN WG1#66, Athens, Greece, Aug. 22-26, 2011 (4 pp.).

Dennis Hui et al., "Joint Routing and Resource Allocation for Wireless Self-Backhaul in an Indoor Ultra-Dense Network," dated Sep. 2013, pp. 3083-3088.

Extended European Search Report, dated Nov. 6, 2018, in European Application No. 16884766.3 (11 pp.).

* cited by examiner

BACKHAUL TRANSMISSION METHOD FOR WIRELESS COMMUNICATION, CONTROLLER, BASE STATION, AND GATEWAY

CROSS-REFERENCE TO RELATED APPLICATIONS

This application is a continuation of International Application No. PCT/CN2016/109277, filed on Dec. 9, 2016, which claims priority to Chinese Patent Application No. 201610029015.X, filed on Jan. 16, 2016. The disclosures of the aforementioned applications are hereby incorporated by reference in their entireties.

TECHNICAL FIELD

Embodiments of this application relate to the communications field, and more specifically, to a backhaul transmission method for wireless communication, a controller, a base station, and a gateway.

BACKGROUND

To increase a network capacity, a development trend of a wireless network is to densely deploy small-sized access points on the wireless network. Based on terminal access at a distance as short as possible, an ultra-dense network (Ultra-dense network, UDN) improves a throughput of a terminal and a regional throughput of a system, and becomes one of core technologies of a next generation wireless network.

On an ultra-dense network with base stations densely deployed, based on a limitation of a factor such as costs, not each base station has a wired backhaul. In other words, not each base station performs wired transmission with a gateway. In this case, a wireless backhaul technology needs to be used on the ultra-dense network. However, no proper solution exists currently.

SUMMARY

This application provides a proper backhaul transmission method for wireless communication, a controller, a base station, a gateway, and a network system.

According to a first aspect, this application provides a backhaul transmission method for wireless communication, including: sending, by a first base station, information about a backhaul requirement of the first base station to a controller; obtaining, by the first base station, information about a codebook from the controller, where the information about the codebook is determined based on the backhaul requirement of the first base station; and performing, by the first base station, backhaul transmission with a gateway by using the codebook.

In this application, a codebook is introduced in backhaul transmission, so that different data can be transmitted on a same time-frequency resource, and a capacity of a backhaul link can be increased. Information about the codebook used in the backhaul transmission is determined based on a backhaul requirement of a base station, so that backhaul requirements of different base stations can be met, and a backhaul capacity of a system is increased.

With reference to the first aspect, in a first possible implementation, the first base station obtains information about a codebook set from the controller, where the codebook set includes J codebooks, J>L, L is a quantity of backhaul transceivers of a base station communicating with the gateway, and the codebook is selected from the codebook set. In this application, the codebook set is determined based on a specific communications requirement, so that a waste of code resources can be avoided.

With reference to the first possible implementation of the first aspect, in a second possible implementation, the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster includes a first backhaul transceiver of the first base station. In this application, a backhaul cluster is divided, so that spatial orthogonality is fully utilized, code multiplexing can be implemented, and the backhaul capacity of the system is further increased.

With reference to the second possible implementation of the first aspect, in a third possible implementation, the sending, by a first base station, information about a backhaul requirement of the first base station to a controller includes: sending, by the first base station, information about a backhaul requirement of the first backhaul transceiver of the first base station to the controller; and the obtaining, by the first base station, information about a codebook from the controller includes: obtaining, by the first base station from the controller, information about a codebook of the first backhaul transceiver of the first base station, where the information about the codebook of the first backhaul transceiver of the first base station is determined based on the backhaul requirement of the first backhaul transceiver of the first base station, and the codebook of the first backhaul transceiver of the first base station is selected from the codebook set corresponding to the first backhaul cluster.

With reference to any one of the foregoing possible implementations of the first aspect, in a fourth possible implementation, the codebook is a non-orthogonal codebook. In this application, the backhaul capacity of the system can be further increased by using the non-orthogonal codebook.

With reference to any one of the foregoing possible implementations of the first aspect, in a fifth possible implementation, the information about the codebook includes a codebook sequence number or a codeword sequence number.

With reference to any one of the first aspect or the foregoing possible implementations of the first aspect, in a sixth possible implementation, that the information about the codebook is determined based on the backhaul requirement of the first base station includes: the information about the codebook is determined based on the backhaul requirement of the first base station and a backhaul capacity of the first base station.

With reference to any one of the first aspect or the foregoing possible implementations of the first aspect, in a seventh possible implementation, the performing, by the first base station, backhaul transmission with a gateway by using the codebook includes: mapping, by the first base station, data onto a modulation symbol based on the codebook, and sending, by the first base station, the modulation symbol to the gateway.

With reference to any one of the first aspect or the first to the sixth possible implementations of the first aspect, in an eighth possible implementation, the performing, by the first base station, backhaul transmission with a gateway by using the codebook includes: receiving, by the first base station, a modulation symbol from the gateway, and demapping, by the first base station, the modulation symbol into data based on the codebook.

According to a second aspect, this application provides a backhaul transmission method for wireless communication, including: obtaining, by a controller, information about a backhaul requirement of a first base station; and sending, by the controller, information about a codebook to the first base station and a gateway to which the first base station belongs, where the information about the codebook is determined by the controller based on the backhaul requirement, and the backhaul transmission is transmission between the first base station and the gateway.

With reference to the second aspect, in a first possible implementation, the controller obtains information about a quantity L of backhaul transceivers of a base station communicating with the gateway, and the controller sends information about a codebook set to the gateway and the first base station, where the codebook set includes J codebooks, J>L, and the codebook is selected from the codebook set.

With reference to the first possible implementation of the second aspect, in a second possible implementation, the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster includes a first backhaul transceiver of the first base station.

With reference to the second possible implementation of the second aspect, in a third possible implementation, the obtaining, by a controller, information about a backhaul requirement of a first base station includes: obtaining, by the controller, information about a backhaul requirement of the first backhaul transceiver of the first base station; and the sending, by the controller, information about a codebook to a gateway and the first base station includes: sending, by the controller, information about a codebook of the first backhaul transceiver of the first base station to the gateway and the first base station, where the information about the codebook of the first backhaul transceiver of the first base station is determined by the controller based on the backhaul requirement of the first backhaul transceiver of the first base station, and the codebook of the first backhaul transceiver of the first base station is selected from the codebook set corresponding to the first backhaul cluster.

With reference to any one of the foregoing possible implementations of the second aspect, in a fourth possible implementation, the codebook is a non-orthogonal codebook.

With reference to any one of the foregoing possible implementations of the second aspect, in a fifth possible implementation, the information about the codebook includes a codebook sequence number or a codeword sequence number.

With reference to any one of the foregoing possible implementations of the second aspect, in a sixth possible implementation, that the information about the codebook is determined based on the backhaul requirement of the first base station includes: the information about the codebook is determined based on the backhaul requirement of the first base station and a backhaul capacity of the first base station.

With reference to any one of the second to the sixth possible implementations of the second aspect, in a seventh possible implementation, the method further includes: obtaining, by the controller, information that is about the first backhaul cluster and sent by the gateway.

According to a third aspect, this application provides a backhaul transmission method for wireless communication, including: obtaining, by a gateway, information about a codebook from a controller, where the information about the codebook is determined based on a backhaul requirement of a first base station; and performing, by the gateway, backhaul transmission with the first base station by using the codebook.

With reference to the third aspect, in a first possible implementation, the gateway sends, to the controller, information about a quantity L of backhaul transceivers of a base station communicating with the gateway, and the gateway obtains information about a codebook set from the controller, where the codebook set includes J codebooks, J>L, and the codebook is selected from the codebook set.

With reference to the first possible implementation of the third aspect, in a second possible implementation, the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster includes a first backhaul transceiver of the first base station.

With reference to the second possible implementation of the third aspect, in a third possible implementation, the obtaining, by a gateway, information about a codebook from a controller includes: obtaining, by the gateway from the controller, information about a codebook of the first backhaul transceiver of the first base station, where the information about the codebook of the first backhaul transceiver of the first base station is determined based on a backhaul requirement of the first backhaul transceiver of the first base station, and the codebook of the first backhaul transceiver of the first base station is selected from the codebook set corresponding to the first backhaul cluster.

With reference to any one of the foregoing possible implementations of the third aspect, in a fourth possible implementation, the codebook is a non-orthogonal codebook.

With reference to any one of the foregoing possible implementations of the third aspect, in a fifth possible implementation, the information about the codebook includes a codebook sequence number or a codeword sequence number.

With reference to any one of the foregoing possible implementations of the third aspect, in a sixth possible implementation, that the information about the codebook is determined based on a backhaul requirement of a first base station includes: the information about the codebook is determined based on the backhaul requirement of the first base station and a backhaul capacity of the first base station.

With reference to any one of the third aspect or the foregoing possible implementations of the third aspect, in a seventh possible implementation, the performing, by the gateway, backhaul transmission with the first base station by using the codebook includes: mapping, by the gateway, data onto a modulation symbol based on the codebook, and sending, by the gateway, the modulation symbol to the first base station.

With reference to any one of the third aspect or the first to the sixth possible implementations of the third aspect, in an eighth possible implementation, the performing, by the first base station, backhaul transmission with a gateway by using the codebook includes: receiving, by the gateway, a modulation symbol from the first base station, and demapping, by the gateway, the modulation symbol into data based on the codebook.

According to a fourth aspect, this application provides a first base station, including: a backhaul transceiver of the first base station; a memory, configured to store an instruction; and a processor, connected to both the memory and the backhaul transceiver of the first base station, and configured to execute the instruction, to perform the following steps when executing the instruction: instructing the backhaul transceiver of the first base station to send information about a backhaul requirement of the first base station to a controller; obtaining information about a codebook from the controller by using the backhaul transceiver of the first base station, where the information about the codebook is determined based on the backhaul requirement of the first base station; and performing backhaul transmission with a gateway by using the backhaul transceiver of the first base station and the codebook.

With reference to the fourth aspect, in a first possible implementation, the processor further performs the following step when executing the instruction: obtaining information about a codebook set from the controller by using the backhaul transceiver of the first base station, where the codebook set includes J codebooks, J>L, L is a quantity of backhaul transceivers of a base station communicating with the gateway, and the codebook is selected from the codebook set.

With reference to the first possible implementation of the fourth aspect, in a second possible implementation, the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster includes a first backhaul transceiver of the first base station.

With reference to the second possible implementation of the fourth aspect, in a third possible implementation, the processor further performs the following steps when executing the instruction: instructing the first backhaul transceiver of the first base station to send information about a backhaul requirement of the first backhaul transceiver of the first base station to the controller; and obtaining information about a codebook of the first backhaul transceiver of the first base station by using the first backhaul transceiver of the first base station, where the information about the codebook of the first backhaul transceiver of the first base station is determined based on the backhaul requirement of the first backhaul transceiver of the first base station, and the codebook of the first backhaul transceiver of the first base station is selected from the codebook set corresponding to the first backhaul cluster.

With reference to any one of the foregoing possible implementations of the fourth aspect, in a fourth possible implementation, the codebook is a non-orthogonal codebook.

With reference to any one of the foregoing possible implementations of the fourth aspect, in a fifth possible implementation, the information about the codebook includes a codebook sequence number or a codeword sequence number.

With reference to any one of the foregoing possible implementations of the fourth aspect, in a sixth possible implementation, that the information about the codebook is determined based on the backhaul requirement of the first base station includes: the information about the codebook is determined based on the backhaul requirement of the first base station and a backhaul capacity of the first base station.

With reference to any one of the fourth aspect or the foregoing possible implementations of the fourth aspect, in a seventh possible implementation, the processor is further configured to map data onto a modulation symbol based on the codebook, and the processor further performs the following step when executing the instruction: instructing the backhaul transceiver of the first base station to send the modulation symbol to the gateway.

With reference to any one of the fourth aspect or the first to the sixth possible implementations of the fourth aspect, in an eighth possible implementation, the processor further performs the following step when executing the instruction: receiving a modulation symbol from the gateway by using the backhaul transceiver of the first base station, and the processor is further configured to demap the modulation symbol into data.

According to a fifth aspect, this application provides a controller, including: a transceiver; a memory, configured to store an instruction; and a processor, connected to both the memory and the transceiver, and configured to execute the instruction, to perform the following steps when executing the instruction: obtaining information about a backhaul requirement of a first base station by using the transceiver; and instructing the transceiver to send information about a codebook to the first base station and a gateway to which the first base station belongs, where the information about the codebook is determined by the processor based on the backhaul requirement, and the backhaul transmission is transmission between the first base station and the gateway.

With reference to the fifth aspect, in a first possible implementation, the controller obtains information about a quantity L of backhaul transceivers of a base station communicating with the gateway, and the controller sends information about a codebook set to the gateway and the first base station, where the codebook set includes J codebooks, J>L, and the codebook is selected from the codebook set.

With reference to the first possible implementation of the fifth aspect, in a second possible implementation, the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster includes a first backhaul transceiver of the first base station.

With reference to the second possible implementation of the fifth aspect, in a third possible implementation, the processor further performs the following steps when executing the instruction: obtaining information about a backhaul requirement of the first backhaul transceiver of the first base station by using the transceiver; and sending information about a codebook of the first backhaul transceiver of the first base station to the gateway and the first base station by using the transceiver, where the information about the codebook of the first backhaul transceiver of the first base station is determined by the controller based on the backhaul requirement of the first backhaul transceiver of the first base station, and the codebook of the first backhaul transceiver of the first base station is selected from the codebook set corresponding to the first backhaul cluster.

With reference to any one of the foregoing possible implementations of the fifth aspect, in a fourth possible implementation, the codebook is a non-orthogonal codebook.

With reference to any one of the foregoing possible implementations of the fifth aspect, in a fifth possible implementation, the information about the codebook includes a codebook sequence number or a codeword sequence number.

With reference to any one of the foregoing possible implementations of the fifth aspect, in a sixth possible implementation, that the information about the codebook is determined by the processor based on the backhaul requirement of the first base station includes: the information about the codebook is determined by the processor based on the backhaul requirement of the first base station and a backhaul capacity of the first base station.

With reference to any one of the second to the sixth possible implementations of the fifth aspect, in a seventh possible implementation, the method further includes: obtaining, by the controller, information that is about the first backhaul cluster and sent by the gateway.

According to a sixth aspect, this application provides a gateway, including: a backhaul transceiver of the gateway; a memory, configured to store an instruction; and a processor, connected to both the memory and the backhaul transceiver, and configured to execute the instruction stored in the memory, to perform the following steps when executing the instruction: obtaining information about a codebook from a controller by using the backhaul transceiver of the gateway, where the information about the codebook is determined based on a backhaul requirement of a first base station; and performing backhaul transmission with the first base station by using the backhaul transceiver of the gateway and the codebook.

With reference to the sixth aspect, in a first possible implementation, the processor further performs the following steps when executing the instruction: instructing the backhaul transceiver of the gateway to send, to the controller, information about a quantity L of backhaul transceivers of a base station communicating with the gateway; and obtaining information about a codebook set from the controller by using the backhaul transceiver, where the codebook set includes J codebooks, J>L, and the codebook is selected from the codebook set.

With reference to the first possible implementation of the sixth aspect, in a second possible implementation, the codebook set is a codebook set corresponding to a first backhaul cluster, the backhaul transceiver of the gateway includes a first backhaul transceiver of the gateway, the first backhaul cluster is a set of backhaul transceivers of the base station performing backhaul transmission with the first backhaul transceiver of the gateway, backhaul links of different backhaul clusters are spatially orthogonal, and the first backhaul cluster includes a first backhaul transceiver of the first base station.

With reference to the second possible implementation of the sixth aspect, in a third possible implementation, the processor further performs the following step when executing the instruction: obtaining information about a codebook of the first backhaul transceiver of the first base station by using the backhaul transceiver of the gateway, where the information about the codebook of the first backhaul transceiver of the first base station is determined based on a backhaul requirement of the first backhaul transceiver of the first base station, and the codebook of the first backhaul transceiver of the first base station is selected from the codebook set corresponding to the first backhaul cluster.

With reference to any one of the foregoing possible implementations of the sixth aspect, in a fourth possible implementation, the codebook is a non-orthogonal codebook.

With reference to any one of the foregoing possible implementations of the sixth aspect, in a fifth possible implementation, the information about the codebook includes a codebook sequence number or a codeword sequence number.

With reference to any one of the foregoing possible implementations of the sixth aspect, in a sixth possible implementation, that the information about the codebook is determined based on a backhaul requirement of a first base station includes: the information about the codebook is determined based on the backhaul requirement of the first base station and a backhaul capacity of the first base station.

With reference to any one of the sixth aspect or the foregoing possible implementations of the sixth aspect, in a seventh possible implementation, the processor is further configured to map data onto a modulation symbol based on the codebook, and the processor further performs the following step when executing the instruction: instructing the backhaul transceiver of the gateway to send the modulation symbol to the first base station.

With reference to any one of the sixth aspect or the first to the sixth possible implementations of the sixth aspect, in an eighth possible implementation, the processor further performs the following step when executing the instruction: receiving a modulation symbol from the first base station by using the backhaul transceiver of the gateway, and the processor is further configured to demap the modulation symbol into data.

An embodiment of the present invention provides a communications system, where the system includes at least two of the controller, the first base station, and the gateway in the foregoing aspects.

An embodiment of the present invention provides a computer storage medium, configured to store a computer software instruction used by the foregoing first base station, controller, or gateway, where the computer software instruction includes a program designed to execute the method in the foregoing aspects.

In this application, a codebook is introduced in backhaul transmission, so that different data can be transmitted on a same time-frequency resource, and a capacity of a backhaul link can be increased. Information about the codebook used in the backhaul transmission is determined based on a backhaul requirement of a base station, so that backhaul requirements of different base stations can be met, and a backhaul capacity of a system is increased.

DESCRIPTION OF EMBODIMENTS

Figure 1:
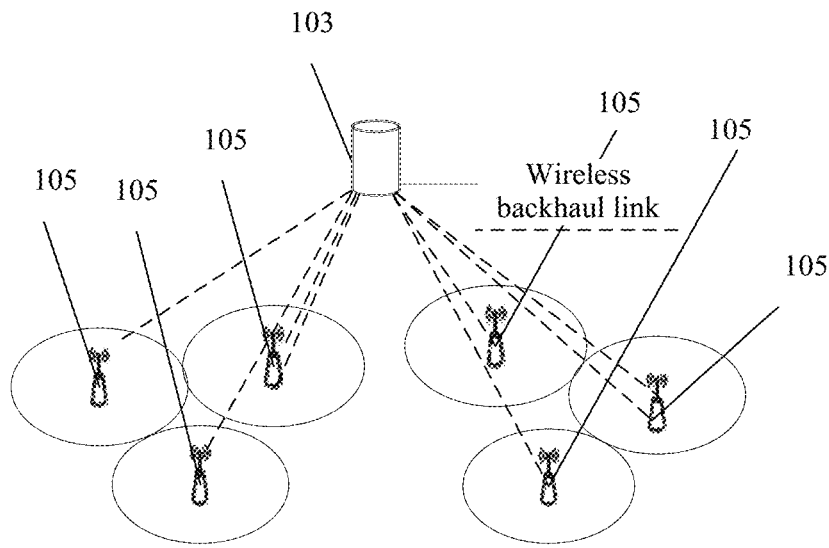
FIG. 1 is a schematic architectural diagram of a backhaul of a wireless communications system according to an embodiment of this application.

A plurality of embodiments are now described with reference to the accompanying drawings, and same components in this specification are indicated by a same reference numeral. In the following description, for ease of explanation, many specific details are provided to facilitate comprehensive understanding of one or more embodiments. However, apparently, the embodiments may not be implemented by using these specific details. In other examples, a well-known structure and device are shown in a form of block diagrams, to conveniently describe one or more embodiments.

A base station may be a transceiver station, a wireless access point (Access Point, AP), a transmission point, a relay node, or the like. A wireless communications network may be a cellular mobile communications network, for example, a Wideband Code Division Multiple Access (Wideband Code Division Multiple Access, WCDMA) network or a Long Term Evolution (Long Term Evolution, LTE) network, or may be a wireless local area network WLAN, a future network, or the like.

As shown in FIG. 1, a wireless communications system includes a gateway (Gateway, GW) 103 and a plurality of base stations 105. Transmission between the gateway (Gateway, GW) 103 and the base stations 105 is backhaul transmission. The wireless communications system may further include another network device. The wireless communications system may further include a controller. The controller may be disposed on the gateway 103, a base station 105, or the another network device of the wireless communications system such as a mobility management entity (mobility management entity, MME).

A backhaul transceiver is a transceiver performing backhaul transmission. In a base station, a transceiver configured to perform backhaul transmission is a backhaul transceiver of the base station; and the transceiver may be disposed together with an access transceiver, or may be separately disposed. In a gateway, a transceiver configured to perform backhaul transmission is a backhaul transceiver of the gateway. A link used for communication between the base station and the gateway is a backhaul link. If the base station and the gateway have a plurality of backhaul transceivers, links used for communication between backhaul transceivers of the base station and backhaul transceivers of the gateway are backhaul links. In this application, the backhaul link is a wireless backhaul link. Each base station 105 performs data transmission with the gateway 103 by using a wireless backhaul link. A backhaul link capacity is a rate of data that can be transmitted on the backhaul link. A backhaul capacity of a base station is a sum of rates of data that can be transmitted on all backhaul links of the base station. A backhaul capacity of a system is a sum of rates of data that can be transmitted on all backhaul links of the system.

During wireless backhaul transmission, a radio spectrum resource needs to be occupied. Because radio spectrum resources become increasingly scarce, wireless backhaul links need to share a band. However, interference also exists between the wireless backhaul links, particularly in an ultra-dense network environment. A feasible solution is orthogonal transmission in time domain or orthogonal transmission in frequency domain. The orthogonal transmission in time domain means that different wireless backhaul links occupy different timeslots for transmission, and the orthogonal transmission in frequency domain means that different wireless backhaul links occupy different frequency spectrum subbands for transmission.

However, in the methods of the orthogonal transmission in time domain and the orthogonal transmission in frequency domain, time domain and frequency domain resources are wasted, particularly on an ultra-dense network. In addition, high data rate services, aggregated by a large quantity of base stations, of a large quantity of terminals need to be transmitted in a wireless backhaul. Consequently, a problem that the wireless backhaul becomes a transmission bottleneck becomes severer.

This application provides a backhaul transmission method for wireless communication, a controller, a base station, a gateway, and a network system, to effectively increase a backhaul capacity of a system.

Figure 2:
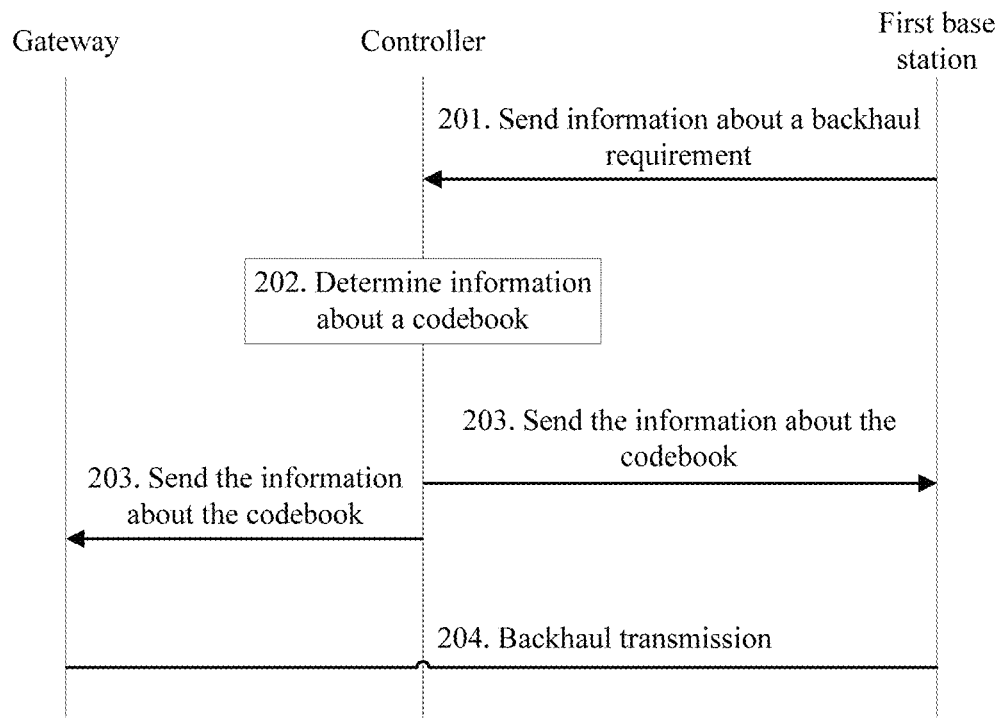
FIG. 2 is a schematic diagram of a backhaul transmission method for wireless communication according to an embodiment of this application.

FIG. 2 shows a backhaul transmission control method according to an embodiment of this application. As shown in FIG. 2, the method includes the following steps:

201. A first base station sends information about a backhaul requirement of the first base station to a controller; and the controller receives the information about the backhaul requirement.

202. The controller determines, based on the backhaul requirement of the first base station, information about a codebook used in backhaul transmission of the first base station.

203. The controller sends the information about the codebook to both the first base station and a gateway to which the first base station belongs.

204. The first base station performs the backhaul transmission with the gateway by using the codebook.

A user requests a service, and different services are corresponding to different requirements. Services with different requirements need to be met by using different backhaul transmission. A backhaul transmission requirement is a backhaul requirement. The backhaul requirement may be embodied by using at least one of a backhaul rate, a backhaul delay, and a backhaul resource. In 201, the backhaul requirement is a sum of service requirements of users that are served by the first base station and that require backhaul transmission. A specific requirement of a service may be a sum of backhaul rate requirements and/or delay requirements of the service. The backhaul requirement of the first base station may be sent by using existing signaling such as a base station configuration update message, or may be sent by using separate signaling.

In 202, the information about the codebook includes a codebook sequence number or a codeword sequence number. The codebook may be a non-orthogonal codebook, such as a sparse code multiple access (Sparse Code Multiple Access, SCMA) codebook, a low density signature (Low Density Signature, LDS) codebook, or a non-orthogonal multiple access (Non-orthogonal Multiple Access, NOMA) codebook. A backhaul capacity can be further increased by using the non-orthogonal codebook.

In 202, a quantity of codebook sequence numbers or codeword sequence numbers is positively correlated with the backhaul requirement. Based on backhaul requirements of different base stations, more codebook sequence numbers or codeword sequence numbers may be allocated to a base station having more backhaul requirements, and fewer codebook sequence numbers or codeword sequence numbers may be allocated to a base station having fewer backhaul requirements. For example, codebook sequence numbers or codeword sequence numbers may be allocated based on a backhaul requirement proportion.

Optionally, to enhance rationality of codebook allocation, the controller may further determine, based on the backhaul requirement of the first base station and a backhaul capacity of the first base station, the information about the codebook used in the backhaul transmission. Specifically, more codebook sequence numbers or codeword sequence numbers may be allocated to a base station having more backhaul requirements. However, a transmission rate that can be implemented by using the allocated codebook sequence numbers or codeword sequence numbers cannot exceed a backhaul capacity of the base station:

$N_{c,i} N_{rb} \log_2 M \leq C_i = N_{rb} \cdot RB \cdot \log_2(1+SNR_i)$, where $N_{c,i}$ is a quantity of codebook sequence numbers or codeword sequence numbers allocated to an $i^{th}$ base station, $N_{rb}$ is a quantity of time-frequency resource blocks, M is a quantity of codewords in the codebook, $C_i$ is a backhaul capacity of the $i^{th}$ base station, RB is a size of a time-frequency resource block, and $SNR_i$ is a signal-to-noise ratio of the $i^{th}$ base station.

Correspondingly, the method may further include: sending, by the first base station, information about the backhaul capacity of the first base station to the controller. When the gateway already obtains the information about the backhaul capacity of the first base station, the gateway may send the information about the backhaul capacity of the first base station to the controller.

The information about the codebook dynamically changes depending on a change of the backhaul requirement. In 201, the first base station may send the information about the backhaul requirement to the controller in a first time period. Correspondingly, in 202 and 203, the codebook is also determined and sent in the first time period.

In 203, if the controller is located on the gateway, the information about the codebook may be sent to the gateway through internal communication, and the information about the codebook may be sent to the first base station by using an external interface. If the controller is located on the first base station, the information about the codebook may be sent to the first base station through internal communication, and the information about the codebook may be sent to the gateway by using an external interface. If the controller is neither located on the gateway, nor located on the first base station, for example, located on a control network element, the information about the codebook is sent to the first base station and the gateway by using an external interface. The external interface may be an X2 interface or an S1 interface.

In 203, when the information about the codebook is sent to the first base station, an identifier of the first base station may be further carried. When the information about the codebook is sent to the gateway, an identifier of the gateway may be further carried. The information about the codebook may be sent by using separate signaling, or may be sent by using resource status update (resource status update) signaling.

When uplink transmission is performed, the first base station is corresponding to a transmit end, and the gateway is corresponding to a receive end. When downlink transmission is performed, the gateway is corresponding to a transmit end, and the first base station is corresponding to a receive end. In 204, the first base station and the gateway may be located at a transmit end and a receive end, respectively.

At the transmit end, during signal processing, a data block may be mapped onto a group of modulation symbols $X_l = \{X_{l1}, X_{l2}, \ldots, X_{lK}\}$ based on the information about the used codebook, where l is a group number, and K indicates a $K^{th}$ symbol in the group, and each modulation symbol is corresponding to one RE in a resource block; and then a signal waveform is generated based on the modulation symbols.

At the receive end, after the modulation symbols are restored based on the signal waveform, the modulation symbols may be restored to the data block based on the information about the used codebook.

Figure 3:
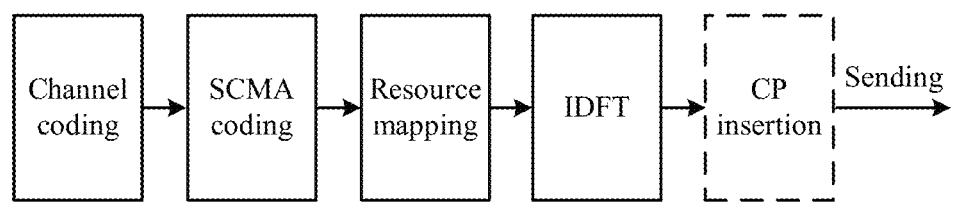
FIG. 3 is a schematic diagram of a processing procedure of a transmit end in a backhaul of a wireless communications system according to an embodiment of this application.

FIG. 3 is a schematic diagram of a processing procedure of a transmit end in a backhaul of a wireless communications system according to an embodiment of this application. An SCMA codebook is used as an example in FIG. 3 for description. A person skilled in the art should understand that a codebook in another form may be alternatively used. As shown in FIG. 3, to-be-sent data undergoing channel coding may be divided into data blocks with particular sizes. Then, an SCMA encoder encodes the data blocks by using information about the codebook, and maps the data blocks onto a group of modulation symbols. Then, resource mapping is performed on the modulation symbols. In other words, the modulation symbols are mapped onto an air interface resource. During the resource mapping, a pilot signal may be further inserted, so that a receive end performs channel estimation for decoding. Then, an operation such as inverse discrete Fourier transform (Inverse Discrete Fourier Transform, IDFT) may be further performed on encoded data, and data undergoing all the processing is sent out. Optionally, before a signal undergoing the IDFT is sent out, a cyclic prefix (Cyclic Prefix, CP) may be further inserted. Based on the cyclic prefix, a transmission channel and the data form a time-domain circular convolution. In other words, frequency domain multiplication is performed, to implement frequency domain equalization at the receive end.

Figure 4:
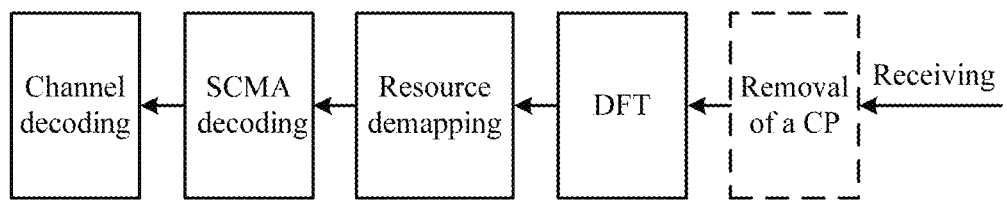
FIG. 4 is a schematic diagram of a processing procedure of a receive end in a backhaul of a wireless communications system according to an embodiment of this application.

FIG. 4 shows a schematic diagram of receiving in backhaul transmission according to an embodiment of this application. As shown in FIG. 4, for received encoded data, a cyclic prefix (Cyclic Prefix, CP) may be removed first, and then discrete Fourier transform (DFT) and resource demapping are performed. An SCMA decoder demaps modulation symbols into data blocks. During decoding, the SCMA decoder may reference a channel estimation value.

Figure 5:
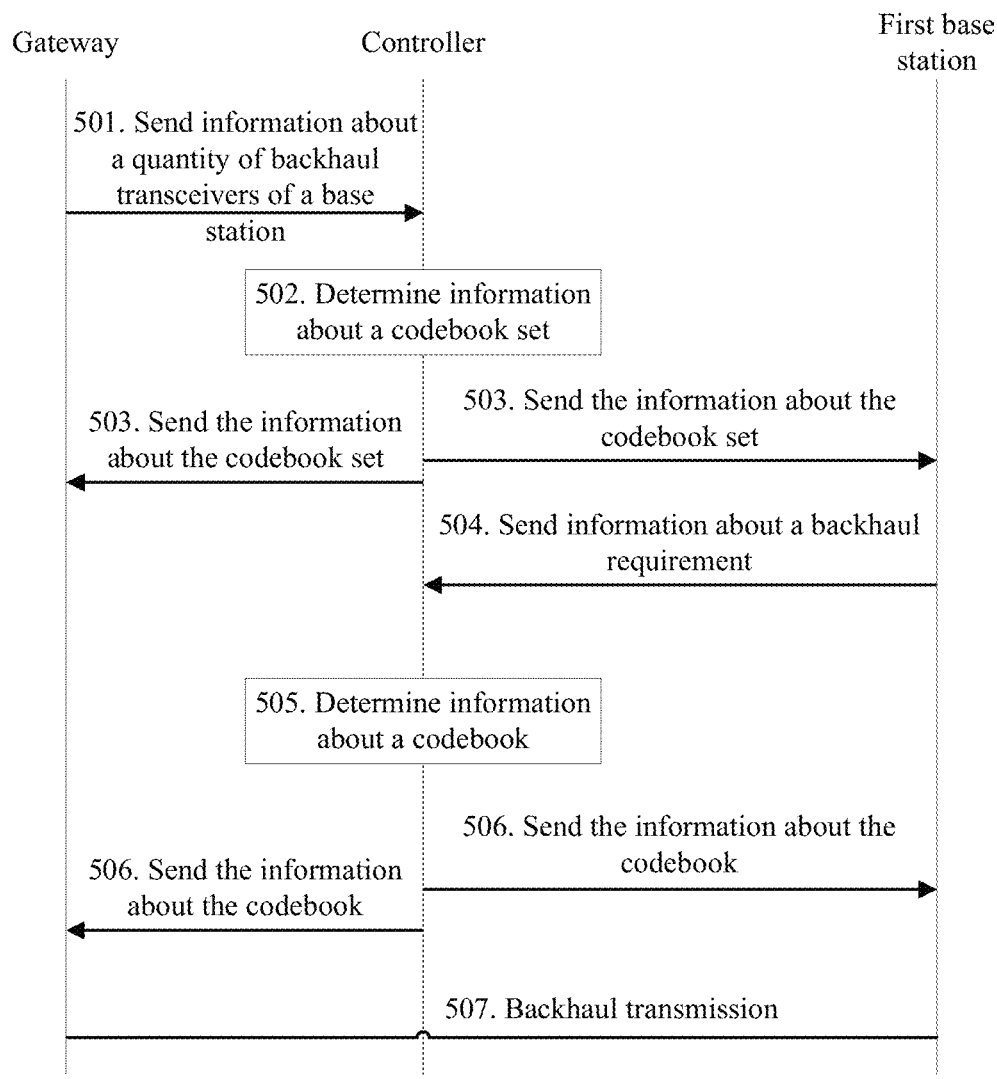
FIG. 5 is a schematic diagram of a backhaul transmission method for wireless communication according to another embodiment of this application.

FIG. 5 is a schematic diagram of a backhaul transmission method for wireless communication according to another embodiment of this application. As shown in FIG. 5, the method includes the following steps:

501. A gateway sends, to a controller, information about a quantity L of backhaul transceivers of a base station communicating with the gateway, and the controller receives the information about the quantity L.

502. The controller determines a codebook set, where the codebook set includes J codebooks, and J>L.

503. The controller sends information about the codebook set to the gateway and a first base station.

504 to 507 are basically the same as 201 to 204. Information about a codebook in 505 is selected from the codebook set in 503. Content in this embodiment that is the same as or similar to content in the foregoing embodiment is not described herein again.

In 502, when the first base station in a wireless communications system has L backhaul transceivers, J (J>L) codebooks are determined. Each codebook includes M codewords, a length of each codeword is K, a quantity of non-zero elements is N, and $$J = \binom{K}{N}.$$

The controller may divide a time-frequency resource into $N_{rb}$ orthogonal time-frequency resource blocks (Resource Block, RB) during a backhaul, and each time-frequency resource block includes K resource elements (Resource Element, RE). $N_{rb}$ is a quantity of time-frequency resource blocks, and K is a length of a codeword in a codebook. After the information about the codebook set is determined, a resource allocation manner can be determined correspondingly. In this application, another manner may be alternatively used to determine a resource allocation manner.

The information about the codebook set may be sent by using separate signaling, or may be sent by using resource status update (resource status update) signaling.

Optionally, in 503, when the information about the codebook set is sent, the information about the codebook set and information about a backhaul resource allocation manner may be sent simultaneously. In this way, backhaul transmission between the gateway and the first base station is simpler and more convenient.

In 503, when the information about the codebook set is sent to the first base station, an identifier of the first base station may be further carried. When the information about the codebook set is sent to the gateway, an identifier of the gateway may be further carried. If the first base station and the gateway already store a plurality of codebook sets, in 503, only a number of the codebook set determined in 502 needs to be sent.

The information about the codebook set changes in a semi-static manner depending on a quantity of backhaul transceivers of the first base station communicating with the gateway. The first base station may send information about a backhaul requirement to the controller in a second time period. The second time period is longer than a first time period.

Figure 6:
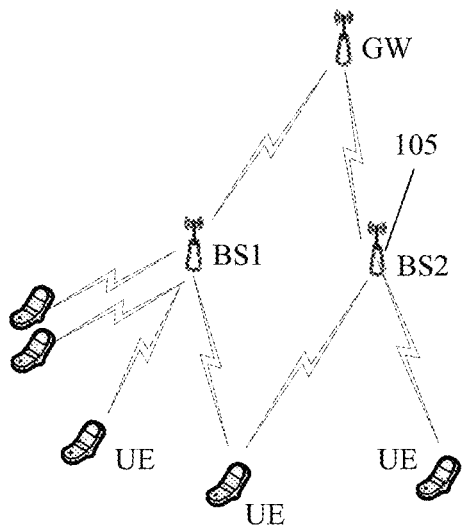
FIG. 6 is a schematic architectural diagram of a wireless communications system according to an embodiment of this application.

FIG. 6 shows a processing case in which a wireless network includes two base stations 105. Each base station 105 has only one backhaul transceiver. In this case, six codebooks (L=2<J=6) may be generated. A backhaul time-frequency resource is divided into several orthogonal resource blocks. Each resource block includes four resource elements, and a quantity of resource elements is determined based on a length of a codeword. The length of the codeword is corresponding to a modulation order corresponding to a codebook. For example, a codebook corresponding to quadrature phase shift keying (Quadrature Phase Shift Keying, QPSK) or fourth-order modulation includes four codewords.

Figure 7:
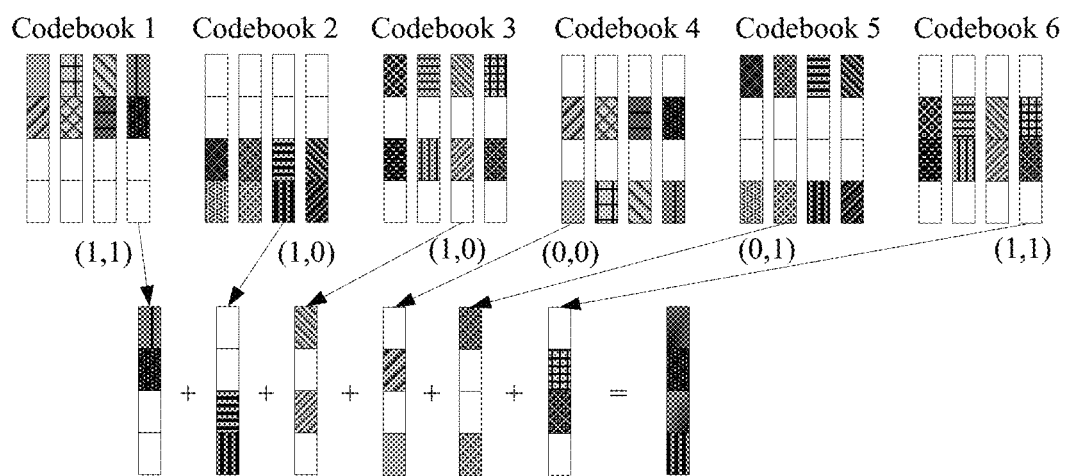
FIG. 7 is a schematic diagram of codebook allocation according to an embodiment of this application.

Backhaul requirements of a first base station BS1 are more than backhaul requirements of a first base station BS2. As shown in FIG. 7, if information about a codebook is a codebook sequence number, four codebooks, such as codebooks whose codebook sequence numbers are 1 to 4, in all of six codebooks in a codebook set may be allocated to the first base station BS1, and two codebooks whose codebook sequence numbers are 5 and 6 may be allocated to the second base station BS2.

Each codebook has four different modulation symbol groups, a length of each modulation symbol group is 4, and each modulation symbol group is corresponding to four resource elements of each resource block. It may be further learned from FIG. 7 that each modulation symbol group has two symbols that are zero and resource elements on which non-zero symbols of a same codebook are located are on a same location. During each transmission, every two bits form a data block, and the data block is corresponding to one codeword in the codebook and is mapped onto a group of modulation symbols. Six groups of modulation symbols are superposed on a same resource block. In this way, the first base station BS1 may transmit eight bits on each RB, where the eight bits are corresponding to codewords of codebooks whose numbers are 1 to 4, respectively. Likewise, the first base station BS2 may transmit four bits on each RB.

If information about a codebook is a codeword sequence number, for the first base station having more backhaul requirements, more codewords are allocated from a codeword set to the first base station. In a case shown in FIG. 7, a codebook set includes six codebooks, that is, 24 codewords. The backhaul requirements of the first base station BS1 are more than the backhaul requirements of the first base station BS2. Therefore, 16 codewords, such as codewords whose codeword sequence numbers are 1 to 16, in all of the 24 codewords in the codeword set are allocated to the first base station BS1, and eight codewords whose codeword sequence numbers are 17 to 24 are allocated to the first base station BS2.

Figure 8:
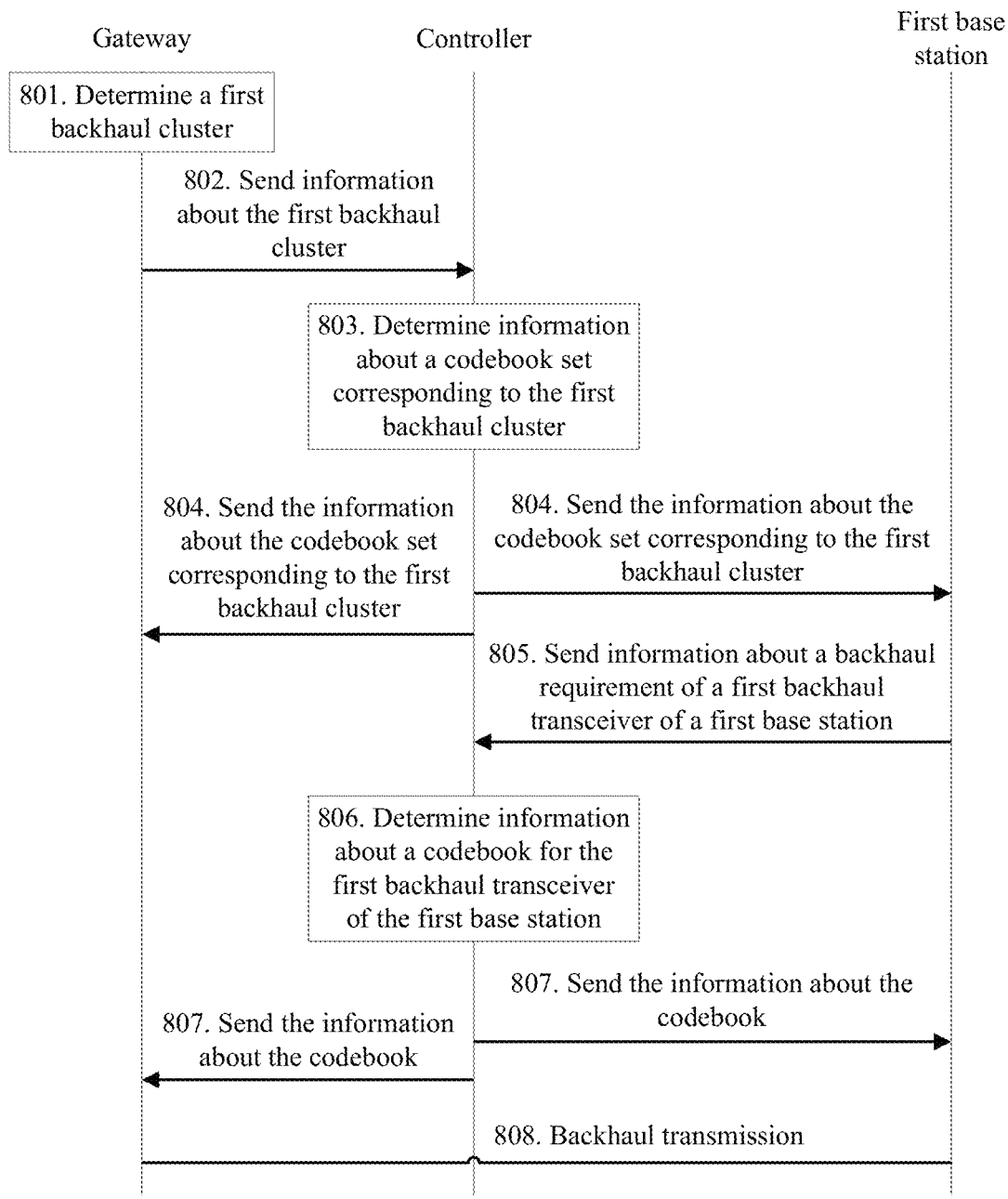
FIG. 8 is a schematic diagram of a backhaul transmission method for wireless communication according to another embodiment of this application.

FIG. 8 is a schematic diagram of a backhaul transmission method for wireless communication according to another embodiment of this application. As shown in FIG. 8, the method includes the following steps:

801. A gateway determines a first backhaul cluster. The first backhaul cluster is a set of backhaul transceivers of a base station performing backhaul transmission with a first backhaul transceiver of the gateway. If the gateway has a plurality of backhaul transceivers, there are correspondingly a plurality of backhaul clusters. Backhaul links of different backhaul clusters are spatially orthogonal. The following further describes a backhaul cluster in detail.

802. The gateway sends information about the first backhaul cluster to a controller. The information about the first backhaul cluster includes a backhaul cluster ID and an ID of a backhaul transceiver of the base station, and the information about the first backhaul cluster may further include a base station ID.

803. The controller determines information about a codebook set corresponding to the first backhaul cluster. Similar to 502, when the base station has L backhaul transceivers in the first backhaul cluster, J (J>L) codebooks are determined.

804. The controller sends the information about the codebook set to the first backhaul transceiver of the gateway and the backhaul transceivers of the base station in the first backhaul cluster, and the first backhaul transceiver of the gateway and the backhaul transceivers of the base station in the first backhaul cluster receive the information about the codebook set. For this step, refer to descriptions in 503.

805. A backhaul transceiver of each base station in the first backhaul cluster sends information about a backhaul requirement to the controller, and the controller receives the information about the backhaul requirement. A first backhaul transceiver of a first base station is used as an example for description below. For a backhaul transceiver of another base station in the first backhaul cluster or another backhaul transceiver of the first base station, processing may be similar.

806. The controller determines information about a codebook for the first backhaul transceiver of the first base station based on a backhaul requirement of the first backhaul transceiver of the first base station. In the entire first backhaul cluster, codebook allocation is positively correlated with a backhaul requirement. More codebook sequence numbers or codeword sequence numbers may be allocated to a backhaul transceiver of a base station having more backhaul requirements, and fewer codebook sequence numbers or codeword sequence numbers may be allocated to a backhaul transceiver of a base station having fewer backhaul requirements. For example, codebook sequence numbers or codeword sequence numbers may be allocated based on a backhaul requirement proportion.

807. The controller sends the information about the codebook to the first backhaul transceiver of the gateway and the first backhaul transceiver of the first base station, and the first backhaul transceiver of the gateway and the first backhaul transceiver of the first base station correspondingly receive the information about the codebook.

808. The first backhaul transceiver of the gateway and the first backhaul transceiver of the first base station perform backhaul transmission by using the codebook.

In 805, based on a sum of backhaul requirements and capacities of all the backhaul transceivers, the base station may allocate the backhaul requirements to all the backhaul transceivers of the base station based on a proportion. An embodiment is as follows:

$$Req_i = Req * C_i \bigg/ \sum_k C_k,$$

where $Req_i$ is a backhaul requirement allocated to an $i^{th}$ backhaul transceiver by the base station, Req is the sum of backhaul requirements of the base station, $C_i$ is a backhaul capacity of the $i^{th}$ backhaul transceiver of the base station, and $$\sum_k C_k$$

is a sum of the capacities of all the backhaul transceivers of the base station.

Optionally, to enhance rationality of codebook allocation, the controller may further determine, based on the backhaul requirement of the first backhaul transceiver of the first base station and a backhaul capacity of the first backhaul transceiver of the first base station, the information about the codebook used in the backhaul transmission. Specifically, more codebook sequence numbers or codeword sequence numbers may be allocated to a backhaul transceiver of a base station having more backhaul requirements. However, a transmission rate that can be implemented by using allocated codebooks or codewords cannot exceed a backhaul capacity of the backhaul transceiver of the base station:

$N_{c,i} N_{rb} \log_2 M \leq C_i = N_{rb} \cdot RB \cdot \log_2(1+SNR_i)$, where $N_{c,i}$ is a quantity of codebook sequence numbers or codeword sequence numbers allocated to an $i^{th}$ backhaul transceiver of the base station, $N_{rb}$ is a quantity of time-frequency resource blocks, M is a quantity of codewords in the codebook, $C_i$ is a backhaul capacity of the $i^{th}$ backhaul transceiver of the base station, RB is a size of a time-frequency resource block, and $SNR_i$ is a signal-to-noise ratio of the $i^{th}$ base station.

Correspondingly, the method may further include: sending, by the first base station, information about the backhaul capacity of the first backhaul transceiver of the first base station to the controller. When the gateway already obtains the information about the backhaul capacity of the first backhaul transceiver of the first base station, the gateway may send the information about the backhaul capacity of the first backhaul transceiver of the first base station to the controller.

In the gateway, one backhaul transceiver is coupled to one antenna unit. If one gateway has a plurality of backhaul transceivers, a plurality of different antenna units are coupled to the plurality of backhaul transceivers. If one base station has a plurality of backhaul transceivers, a plurality of different antenna units are coupled to the plurality of backhaul transceivers. The antenna units of the gateway are spatially orthogonal. The antenna units of the base station are spatially orthogonal. In this way, backhaul links between the backhaul transceivers of the gateway and the backhaul transceivers of the base station are different in directions and are spatially orthogonal.

Spatial orthogonality can be utilized through backhaul cluster division. When a quantity of backhaul transceivers of a base station in a backhaul cluster changes, the backhaul cluster changes. Correspondingly, information about a codebook set also changes. When a backhaul requirement of a backhaul transceiver of a particular base station in the backhaul cluster changes, information about a codebook correspondingly changes. When the backhaul requirement changes, the controller needs to send information about a codebook set and information about a codebook that are changed.

A codebook set can be multiplexed among backhaul clusters through the backhaul cluster division, and a backhaul capacity of an ultra-dense network is further increased.

Figure 9:
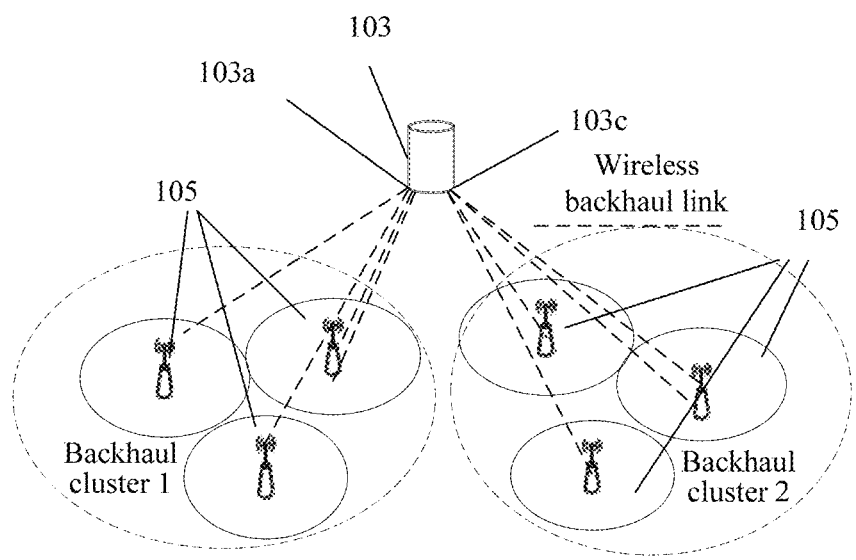
FIG. 9 shows an architecture of a wireless communications system including two backhaul clusters according to an embodiment of this application.

As shown in FIG. 9, one backhaul transceiver of a gateway can be corresponding to one backhaul cluster. FIG. 9 shows that a gateway 103 has two backhaul transceivers: a first backhaul transceiver 103a and a second backhaul transceiver 103c. In this way, the gateway 103 can be corresponding to two backhaul clusters: a backhaul cluster 1 and a backhaul cluster 2.

Figure 10:
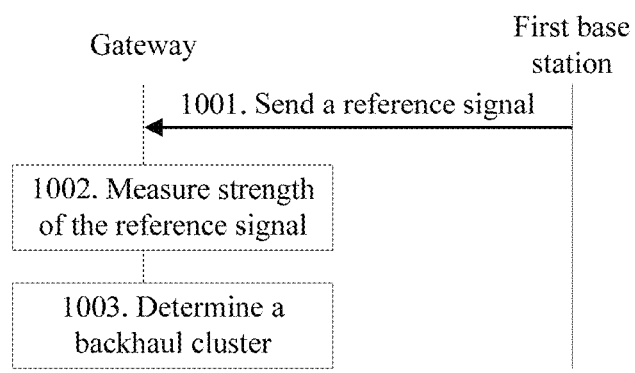
FIG. 10 is a schematic diagram of a backhaul cluster determining method according to an embodiment of this application.

The following further describes in detail how to determine a backhaul cluster. FIG. 10 is a schematic diagram of a backhaul cluster division method. As shown in FIG. 10, the method includes the following steps:

1001. A first base station sends, to a gateway, a reference signal from each backhaul transceiver of the first base station to each backhaul transceiver of the gateway, and the gateway receives the reference signal. The gateway further receives a reference signal sent by a backhaul transceiver of another base station surrounding the gateway. The reference signal may be a pilot signal or another reference signal.

1002. The gateway measures strength of a signal between each backhaul transceiver of the gateway and each backhaul transceiver of a base station surrounding the gateway.

1003. Add a backhaul transceiver of a base station with signal strength greater than a preset value T to a backhaul cluster corresponding to a backhaul transceiver of the gateway. The preset value T may be preset based on an actual case. For example, the preset value T may be set as sensitivity of the backhaul transceiver of the gateway.

If both strength of a signal from a backhaul transceiver of a base station to a first backhaul transceiver of the gateway and strength of a signal from the backhaul transceiver of the base station to another backhaul transceiver of the gateway are greater than the preset value T, the signal strength may be compared, and the backhaul transceiver of the base station is added to a backhaul cluster corresponding to a backhaul transceiver that is of the gateway and that is corresponding to maximum signal strength.

For example, as shown in FIG. 9, strength A1 of a signal from a first backhaul transceiver 103a of a gateway to a first backhaul transceiver of a base station is greater than the preset value T, and strength A2 of a signal from a second backhaul transceiver 103b of the gateway to the first backhaul transceiver of the base station is greater than the preset value T. If A2 is greater than A1, the first backhaul transceiver of the base station is added to a second backhaul cluster 2. If A2 is equal to A1, the first backhaul transceiver of the base station is added to a first backhaul cluster 1 or the second backhaul cluster 2 that is corresponding to the first backhaul transceiver 103a of the gateway and corresponding to A1 or A2.

It should be noted that a plurality of backhaul transceivers of a base station may be added to one backhaul cluster or may be added to a plurality of different backhaul clusters. This mainly depends on strength of signals between the backhaul transceivers of the base station and the backhaul transceiver of the gateway.

Figure 11:
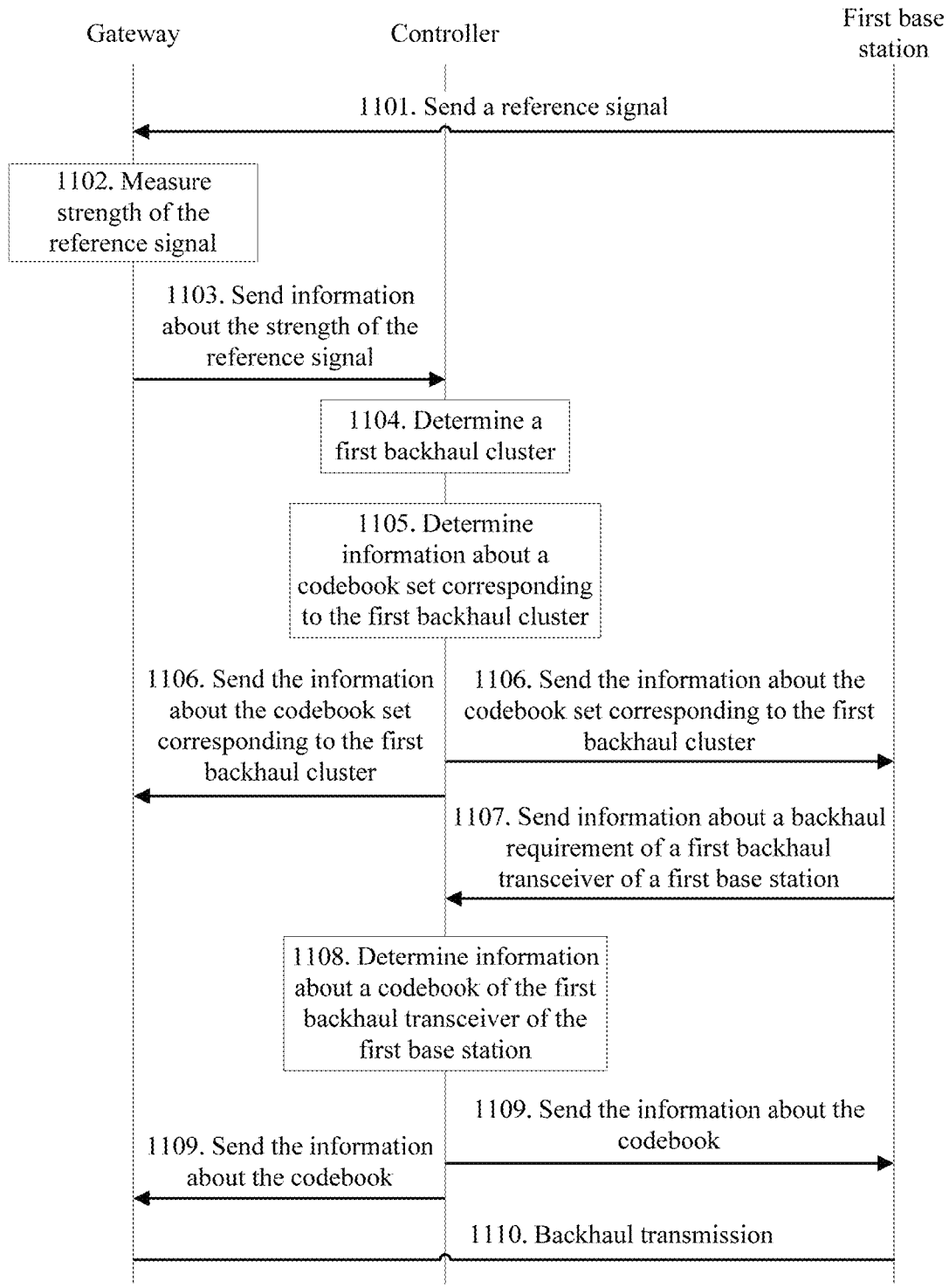
FIG. 11 is a schematic diagram of a wireless backhaul controlling device according to an embodiment of this application.

FIG. 11 is a schematic interactive diagram of a backhaul transmission method for wireless communication according to another embodiment of this application. As shown in FIG. 11, the method includes the following steps:

1101 is basically the same as 1001.

1102 is basically the same as 1002.

1103. The gateway sends strength of a signal between a first backhaul transceiver of the gateway and each backhaul transceiver of the base station surrounding the gateway to a controller.

1104. The controller determines a first backhaul cluster. For a backhaul cluster determining method, refer to the foregoing descriptions.

1105 to 1110 are basically the same as 803 to 808.

The foregoing mainly describes, from a perspective of interaction between network elements, the solutions provided in the embodiments of the present invention. It may be understood that, to implement the foregoing functions, the network elements include corresponding hardware structures and/or software modules executing the functions. A person skilled in the art should be easily aware that, with reference to the embodiments disclosed in this specification, the present invention can be implemented in a form of hardware or in a form of a combination of hardware and computer software. Whether a function is performed in a manner of hardware or in a manner of using computer software to drive hardware depends on particular applications and designed constraint conditions of the technical solutions. A person skilled in the art may use different methods to implement the described functions for each particular application, but it should not be considered that the implementation goes beyond the scope of the present invention.

This application further provides apparatus embodiments for implementing steps and methods in the foregoing method embodiments.

Figure 12:
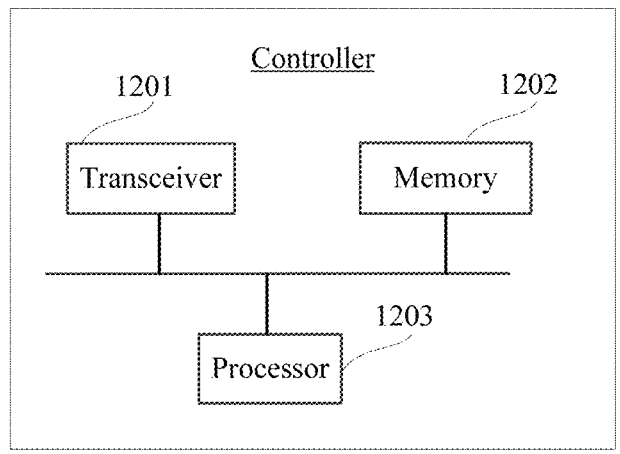
FIG. 12 is a schematic diagram of a controller according to an embodiment of this application.

FIG. 12 shows a possible schematic structural diagram of a controller provided in the foregoing embodiments. As shown in FIG. 12, the controller includes: a transceiver 1201; a memory 1202, configured to store an instruction; and a processor 1203, connected to both the memory 1202 and the transceiver 1201, and configured to execute the instruction. When executing the instruction, the processor performs the foregoing receiving, sending, and obtaining steps and the like of the controller in the foregoing embodiments by using the transceiver 1201. When executing the instruction, the processor 1203 further performs control and processing steps and the like.

Specifically, when executing the instruction, the processor 1202 performs the following steps: obtaining information about a backhaul requirement of a first base station by using the transceiver 1201; and instructing the transceiver 1201 to send information about a codebook to the first base station and a gateway to which the first base station belongs, where the information about the codebook is determined by the processor 1203 based on the backhaul requirement, and the backhaul transmission is transmission between the first base station and the gateway.

When executing the instruction, the processor 1203 further performs the following steps: obtaining, by using the transceiver 1201, information about a quantity L of backhaul transceivers 1201 of a base station communicating with the gateway; and instructing the transceiver 1201 to send information about a codebook set to the gateway and the first base station, where the codebook set includes J codebooks, J>L, and the codebook is selected from the codebook set.

The codebook set is a codebook set corresponding to a first backhaul cluster, the first backhaul cluster is a set of backhaul transceivers 1201 of the base station performing backhaul transmission with a first backhaul transceiver 1201 of the gateway, backhaul links of different backhaul clusters are spatially orthogonal, and the first backhaul cluster includes a first backhaul transceiver 1201 of the first base station.

When executing the instruction, the processor 1203 further performs the following steps: obtaining information about a backhaul requirement of the first backhaul transceiver 1201 of the first base station by using the transceiver 1201; and instructing the transceiver 1201 to send information about a codebook of the first backhaul transceiver 1201 of the first base station to the gateway and the first base station, where the information about the codebook of the first backhaul transceiver 1201 of the first base station is determined by the controller based on the backhaul requirement of the first backhaul transceiver 1201 of the first base station, and the codebook of the first backhaul transceiver 1201 of the first base station is selected from the codebook set corresponding to the first backhaul cluster.

Figure 13:
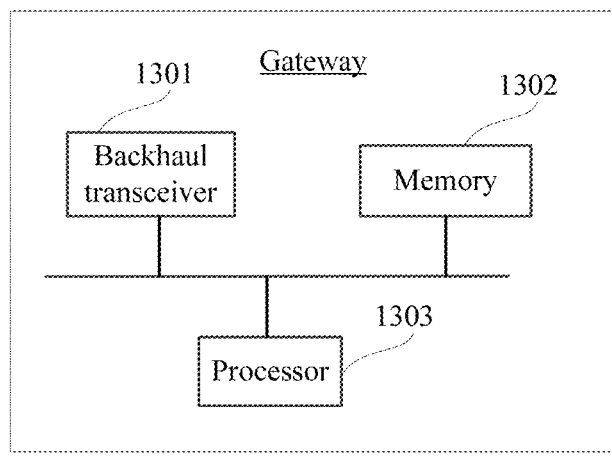
FIG. 13 is a schematic diagram of a gateway according to an embodiment of this application.

FIG. 13 shows a possible schematic structural diagram of a gateway provided in the foregoing embodiments. As shown in FIG. 13, the gateway includes: a first backhaul transceiver 1301; a memory 1302, configured to store an instruction; and a processor 1303, connected to both the memory 1302 and the first backhaul transceiver 1301, and configured to execute the instruction. When executing the instruction, the processor 1302 performs the foregoing receiving, sending, and obtaining steps and the like of the controller in the foregoing embodiments by using the first backhaul transceiver 1301. When executing the instruction, the processor 1303 further performs control and processing steps and the like.

Specifically, when executing the instruction, the processor 1303 performs the following steps: obtaining information about a codebook from a controller by using the backhaul transceiver 1301 of the gateway, where the information about the codebook is determined based on a backhaul requirement of a first base station; and performing backhaul transmission with the first base station by using the backhaul transceiver 1301 of the gateway and the codebook.

When executing the instruction, the processor 1303 further performs the following steps: instructing the backhaul transceiver 1301 of the gateway to send, to the controller, information about a quantity L of backhaul transceivers of a base station communicating with the gateway; and obtaining information about a codebook set from the controller by using the backhaul transceiver, where the codebook set includes J codebooks, J>L, and the codebook is selected from the codebook set.

The codebook set is a codebook set corresponding to a first backhaul cluster, the backhaul transceiver of the gateway includes a first backhaul transceiver of the gateway, the first backhaul cluster is a set of backhaul transceivers of the base station performing backhaul transmission with the first backhaul transceiver of the gateway, backhaul links of different backhaul clusters are spatially orthogonal, and the first backhaul cluster includes a first backhaul transceiver of the first base station.

When executing the instruction, the processor 1303 further performs the following step: obtaining information about a codebook of the first backhaul transceiver of the first base station by using the backhaul transceiver 1301 of the gateway, where the information about the codebook of the first backhaul transceiver of the first base station is determined based on a backhaul requirement of the first backhaul transceiver of the first base station, and the codebook of the first backhaul transceiver of the first base station is selected from the codebook set corresponding to the first backhaul cluster.

Figure 14:
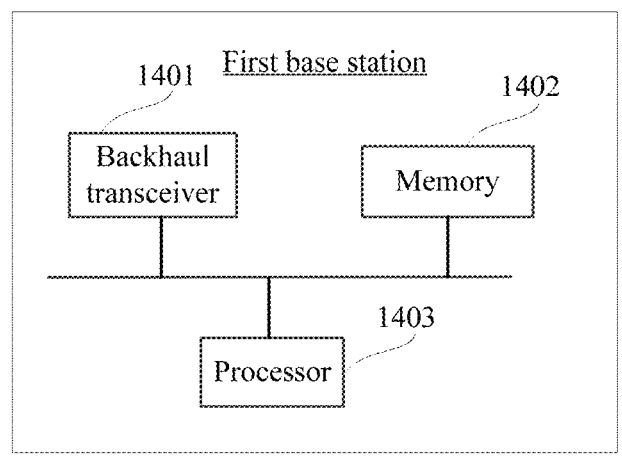
FIG. 14 is a schematic diagram of a first base station according to an embodiment of this application.

FIG. 14 shows a possible schematic structural diagram of a first base station provided in the foregoing embodiments. As shown in FIG. 14, the first base station includes: a first backhaul transceiver 1401; a memory 1402, configured to store an instruction; and a processor 1403, connected to both the memory 1402 and the first backhaul transceiver 1401, and configured to execute the instruction. When executing the instruction, the processor 1402 performs the foregoing receiving, sending, and obtaining steps and the like of the controller in the foregoing embodiments by using the first backhaul transceiver 1401. When executing the instruction, the processor 1403 further performs control and processing steps and the like.

Specifically, when executing the instruction, the processor 1403 performs the following steps: instructing the backhaul transceiver 1401 of the first base station to send information about a backhaul requirement of the first base station to a controller; obtaining information about a codebook from the controller by using the backhaul transceiver 1401 of the first base station, where the information about the codebook is determined based on the backhaul requirement of the first base station; and performing backhaul transmission with a gateway by using the backhaul transceiver 1401 of the first base station and the codebook.

When executing the instruction, the processor further performs the following step: obtaining information about a codebook set from the controller by using the backhaul transceiver 1401 of the first base station, where the codebook set includes J codebooks, J>L, L is a quantity of backhaul transceivers of a base station communicating with the gateway, and the codebook is selected from the codebook set.

The codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster includes a first backhaul transceiver of the first base station.

When executing the instruction, the processor 1403 further performs the following steps: instructing the first backhaul transceiver of the first base station to send information about a backhaul requirement of the first backhaul transceiver of the first base station to the controller; and obtaining information about a codebook of the first backhaul transceiver of the first base station by using the first backhaul transceiver of the first base station, where the information about the codebook of the first backhaul transceiver of the first base station is determined based on the backhaul requirement of the first backhaul transceiver of the first base station, and the codebook of the first backhaul transceiver of the first base station is selected from the codebook set corresponding to the first backhaul cluster.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the system and apparatus described above, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the structure division is merely logical function division and may be other division in actual implementation. For example, a plurality of components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit.

Network entity names in all the embodiments of this application may be extended as names having a same or similar function.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a CD (Compact Disk, compact disk), a DVD (Digital Versatile Disk, digital versatile disk), a smart card, and a flash memory component (for example, an EPROM (Erasable Programmable Read-Only Memory, erasable programmable read-only memory), a card, a stick, or a key drive). In addition, various storage media described in this specification may indicate one or more devices and/or other machine-readable media configured to store information. The term "machine-readable media" may include but is not limited to a radio channel and various other media that can store, contain, and/or carry an instruction and/or data.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A backhaul transmission method for wireless communication, comprising:
    sending, by a first base station, information about a backhaul transmission requirement of the first base station to a controller;
    obtaining, by the first base station, information about a codebook from the controller, wherein the information about the codebook is determined based on the backhaul transmission requirement of the first base station;
    performing, by the first base station, backhaul transmission with a gateway by using the codebook; and
    obtaining, by the first base station, information about a codebook set from the controller, wherein
    the codebook set comprises J codebooks, J>L, L is a quantity of backhaul transceivers of a base station communicating with the gateway, and the codebook is selected from the codebook set, and wherein
    the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster comprises a first backhaul transceiver of the first base station.

2. The method according to claim 1, wherein the sending, by a first base station, information about a backhaul requirement of the first base station to a controller comprises: sending, by the first base station, information about a backhaul requirement of the first backhaul transceiver of the first base station to the controller; and the obtaining, by the first base station, information about a codebook from the controller comprises: obtaining, by the first base station from the controller, information about a codebook of the first backhaul transceiver of the first base station, wherein the information about the codebook of the first backhaul transceiver of the first base station is determined based on the backhaul requirement of the first backhaul transceiver of the first base station, and the codebook of the first backhaul transceiver of the first base station is selected from the codebook set corresponding to the first backhaul cluster.

3. The method according to claim 1, wherein the codebook is a non-orthogonal codebook.

4. A backhaul transmission method for wireless communication, comprising:
    obtaining, by a controller, information about a backhaul transmission requirement of a first base station;
    sending, by the controller, information about a codebook to the first base station and a gateway to which the first base station belongs, wherein the information about the codebook is determined by the controller based on the backhaul transmission requirement, and the backhaul transmission is transmission between the first base station and the gateway;
    obtaining, by the controller, information about a quantity L of backhaul transceivers of a base station communicating with the gateway; and
    sending, by the controller, information about a codebook set to the gateway and the first base station, wherein the codebook set comprises J codebooks, J>L, and the codebook is selected from the codebook set, wherein
    the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster comprises a first backhaul transceiver of the first base station.

5. The method according to claim 4, wherein the obtaining, by a controller, information about a backhaul requirement of a first base station comprises: obtaining, by the controller, information about a backhaul requirement of the first backhaul transceiver of the first base station; and the sending, by the controller, information about a codebook to a gateway and the first base station comprises: sending, by the controller, information about a codebook of the first backhaul transceiver of the first base station to the gateway and the first base station, wherein the information about the codebook of the first backhaul transceiver of the first base station is determined by the controller based on the backhaul requirement of the first backhaul transceiver of the first base station, and the codebook of the first backhaul transceiver of the first base station is selected from the codebook set corresponding to the first backhaul cluster.

6. A backhaul transmission method for wireless communication, comprising:
  obtaining, by a gateway, information about a codebook from a controller, wherein the information about the codebook is determined based on a backhaul transmission requirement of a first base station;
  performing, by the gateway, backhaul transmission with the first base station by using the codebook;
  sending, by the gateway to the controller, information about a quantity L of backhaul transceivers of a base station communicating with the gateway; and
  obtaining, by the gateway, information about a codebook set from the controller, wherein the codebook set comprises J codebooks, J>L, and the codebook is selected from the codebook set, wherein
  the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster comprises a first backhaul transceiver of the first base station.

7. The method according to claim 6, wherein the obtaining, by a gateway, information about a codebook from a controller comprises: obtaining, by the gateway from the controller, information about a codebook of the first backhaul transceiver of the first base station, wherein the information about the codebook of the first backhaul transceiver of the first base station is determined based on a backhaul requirement of the first backhaul transceiver of the first base station, and the codebook of the first backhaul transceiver of the first base station is selected from the codebook set corresponding to the first backhaul cluster.

8. A first base station, comprising:
  a backhaul transceiver of the first base station;
  a memory, configured to store an instruction; and
  a processor, connected to both the memory and the backhaul transceiver of the first base station, and configured to execute the instruction, to perform the following operations when executing the instruction:
  instructing the backhaul transceiver of the first base station to send information about a backhaul transmission requirement of the first base station to a controller;
  obtaining information about a codebook from the controller by using the backhaul transceiver of the first base station, wherein the information about the codebook is determined based on the backhaul transmission requirement of the first base station; and
  performing backhaul transmission with a gateway by using the backhaul transceiver of the first base station and the codebook; and
  obtaining information about a codebook set from the controller by using the backhaul transceiver of the first base station, wherein
  the codebook set comprises J codebooks, J>L, L is a quantity of backhaul transceivers of a base station communicating with the gateway, and the codebook is selected from the codebook set, and wherein the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster comprises a first backhaul transceiver of the first base station.

9. A controller, comprising:
  a transceiver;
  a memory, configured to store an instruction; and
  a processor, connected to both the memory and the transceiver, and configured to execute the instruction, to perform the following operations when executing the instruction:
  obtaining information about a backhaul transmission requirement of a first base station by using the transceiver;
  instruct the transceiver to send information about a codebook to the first base station and a gateway to which the first base station belongs, wherein the information about the codebook is determined by the processor based on the backhaul transmission requirement, and the backhaul transmission is transmission between the first base station and the gateway;
  obtaining, by using the transceiver, information about a quantity L of backhaul transceivers of a base station communicating with the gateway; and
  instructing the transceiver to send information about a codebook set to the gateway and the first base station, wherein the codebook set comprises J codebooks, J>L, and the codebook is selected from the codebook set, wherein
  the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster comprises a first backhaul transceiver of the first base station.

10. A gateway, comprising:
  a backhaul transceiver of the gateway;
  a memory, configured to store an instruction; and
  a processor, connected to both the memory and the backhaul transceiver, and configured to execute the instruction stored in the memory, to perform the following operations when executing the instruction:
  obtaining information about a codebook from a controller by using the backhaul transceiver of the gateway, wherein the information about the codebook is determined based on a backhaul transmission requirement of a first base station; and
  performing backhaul transmission with the first base station by using the backhaul transceiver of the gateway and the codebook;
  instructing the backhaul transceiver of the gateway to send, to the controller, information about a quantity L of backhaul transceivers of a base station communicating with the gateway; and
  obtaining information about a codebook set from the controller by using the backhaul transceiver, wherein the codebook set comprises J codebooks, J>L, and the codebook is selected from the codebook set, wherein
  the codebook set is a codebook set corresponding to a first backhaul cluster, the first backhaul cluster is a set of backhaul transceivers of the base station performing backhaul transmission with a first backhaul transceiver of the gateway, backhaul links of different backhaul clusters are spatially orthogonal, and the first backhaul cluster comprises a first backhaul transceiver of the first base station.

* * * * *

UNITED STATES PATENT AND TRADEMARK OFFICE
CERTIFICATE OF CORRECTION

PATENT NO. : 10,797,775 B2  
APPLICATION NO. : 16/036142  
DATED : October 6, 2020  
INVENTOR(S) : Hongcheng Zhuang and Zezhou Luo Page 1 of 1

It is certified that error appears in the above-identified patent and that said Letters Patent is hereby corrected as shown below:

In the Claims

In Claim 2, Column 22, Line 18, delete "backhaul requirement" and insert --backhaul transmission requirement--.

In Claim 2, Column 22, Line 21, delete "backhaul requirement" and insert --backhaul transmission requirement--.

In Claim 2, Column 22, Line 29, delete "backhaul requirement" and insert --backhaul transmission requirement--.

In Claim 5, Column 22, Line 62, delete "backhaul requirement" and insert --backhaul transmission requirement--.

In Claim 5, Column 22, Line 64, delete "backhaul requirement" and insert --backhaul transmission requirement--.

In Claim 5, Column 23, Line 5-6, delete "backhaul requirement" and insert --backhaul transmission requirement--.

In Claim 7, Column 23, Line 39, delete "backhaul requirement" and insert --backhaul transmission requirement--.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*